Figure 1:
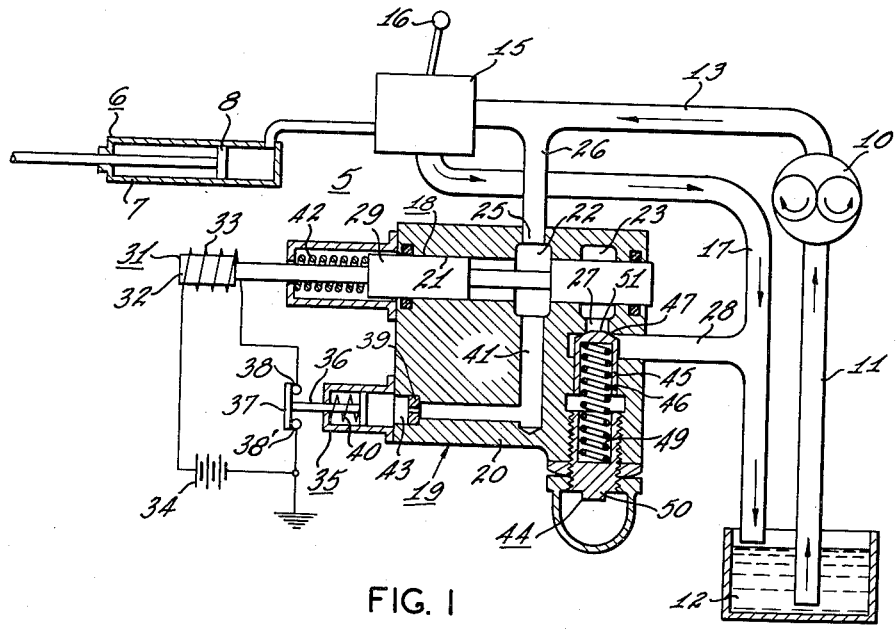

Nov. 27, 1962 H. L. ECKERT 3,065,762
PILOT TYPE RELIEF VALVE
Filed Sept. 4, 1959

INVENTOR
HERBERT L. ECKERT
BY
ATTORNEY

United States Patent Office 3,065,762
Patented Nov. 27, 1962

3,065,762
PILOT TYPE RELIEF VALVE
Herbert L. Eckert, Cedar Rapids, Iowa, assignor to Allis-Chalmers Manufacturing Company, Milwaukee, Wis.
Filed Sept. 4, 1959, Ser. No. 838,215
1 Claim. (Cl. 137—108)

This invention relates generally to fluid pressure systems and is more particularly concerned with a solenoid operated pilot type relief valve to be incorporated into such systems.

In the manufacture of relief valves for conventional hydraulic systems a spring is usually employed to bias the valve to a closed position. Valves of this general type have one major fault; namely, they open and close gradually over a range of pressures rather than instantaneously in response to a predetermined pressure. This fault is generally recognized and is, of course, due to the well known principle that spring force increases in proportion to displacement of the spring. The result is that the spring biased valve will not be completely open until the full relief pressure is reached, nor will it be completely closed until the pressure drops sufficiently below the relief pressure.

This gives rise to several unwanted tendencies, for instance, as the working pressure in the hydraulic system approaches the relief pressure, the spring may not be completely overcome and the valve will tend to open slightly and then suddenly close resulting in what is commonly known as chattering. Also, due to the opening and closing some of the fluid is permitted to escape back into the reservoir resulting in slower or spongy operation of hydraulic motor means of the system. Further, during the opening cycle of the valve when it is only partly open and before the full relief pressure is reached, the fluid passing between the valve seat and plunger is throttled which tends to heat the oil. Excessive heating of the oil may have detrimental effects upon the hydraulic system in addition to loss of efficiency due to the dissipation of energy as heat.

It is, therefore, an object of the present invention to provide a relief valve assembly which overcomes the disadvantages hereinbefore pointed out in an entirely satisfactory manner.

It is a more specific object of this invention to provide a solenoid operated pilot type relief valve which is simple and compact and will provide instantaneous pressure relief when the full relief pressure is reached in the system.

It is a further object of the present invention to provide a pilot type relief valve with a solenoid operated pilot valve in order to instantaneously open and close the relief passage and prevent throttling of fluid or chattering of the main relief valve.

It is still a further object of the present invention to provide an improved pilot type relief valve having a solenoid operated pilot valve incorporating a fail safe feature so that upon an electrical failure the main relief valve will continue to operate and thereby prevent serious damage to the hydraulic system.

Figure 2:
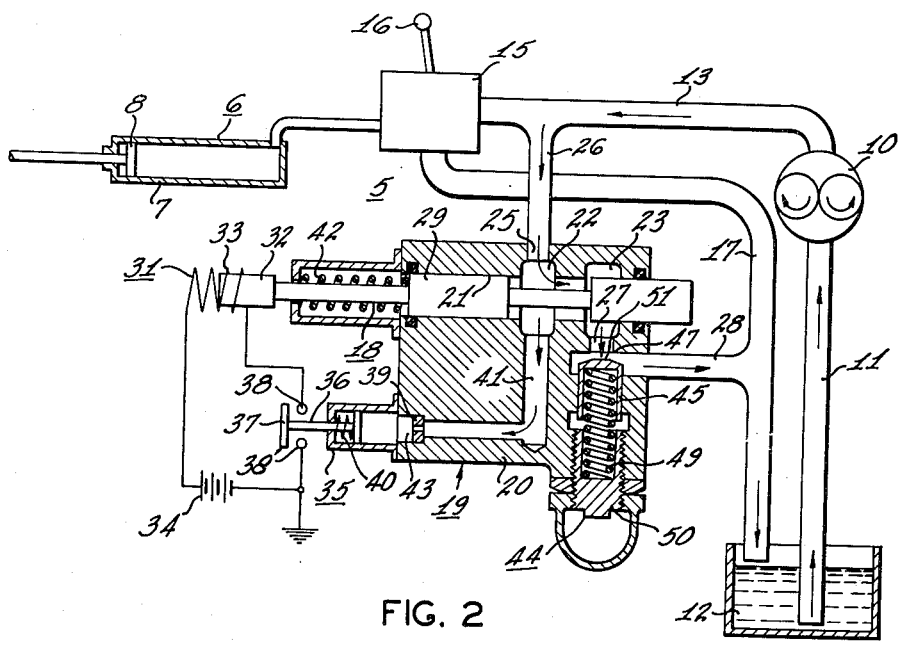

These and other objects and advantages will become apparent to those skilled in the art when the following detailed description is read in conjunction with the appended drawings in which:

FIG. 1 is a diagrammatic view of a hydraulic system and shows a sectional view of a solenoid operated pilot type relief valve assembly, the valve assembly being disposed in the normal or closed condition; and FIG. 2 is a diagrammatic view similar to FIG. 1 showing the relief valve assembly disposed in the opened or full relief position.

Referring to FIGS. 1 and 2, the hydraulic system 5 which has been selected to illustrate this invention is a well known type of hydraulic motor system comprising a conventional single acting jack 6 having a cylinder 7 with a piston and rod 8 reciprocably carried therein; a pump 10 which is of the well known gear type connected by means of a suction conduit 11 to a source of hydraulic fluid contained in reservoir 12 and is also connected on its high pressure side to a discharge conduit 13 leading to a control valve 15. As shown in FIG. 1, the hand lever 16 of control valve 15, which is also conventional, is disposed in a nonoperating position whereby oil being delivered to valve 15 is returned directly to reservoir 12 through a return conduit 17.

In order to prevent damage to the hydraulic system a relief valve assembly 19 is connected in communication with the high pressure side of pump 10 in order to relieve the system of pressures exceeding a safe working pressure. The relief valve assembly 19 includes a main valve body 20. A solenoid operated pilot valve assembly 18 includes a pilot valve bore 21 formed within the main body 20. An inlet port 22 and an outlet port 23 are provided in bore 21. Port 22 is connected by means of an inlet passage 25, formed in the valve body 20, to conduit 26 which in turn is connected to conduit 13. Port 23 is connected to an exhaust passage 27 formed within valve body 20 which in turn is connected by means of exhaust conduit 28 to return conduit 17. Passageway 27, exhaust conduit 28 and a portion of return conduit 17 in effect form a passage means for interconnecting outlet port 23 with reservoir 12. A pilot valve spool or spindle 29 is slidably carried within bore 21 for controlling interport flow therein in the well known manner. The valve spool 29 is hydraulically balanced, that is hydraulic pressure of fluid in contact with the valve spool does not bias it.

A diagrammatically illustrated solenoid, identified by reference numeral 31, is to be of a known type and includes an armature 32 which is connected to the valve spindle 29 and a coil 33 within which armature 32 is mounted. Coil 33 is connected to a source of electric power, indicated at 34, through a diagrammatically illustrated pressure sensitive switch, indicated generally by reference numeral 35. It is not intended to limit this invention to the specific details of the solenoid circuit as illustrated. The circuit, for instance, may include a master switch as well as other components.

The pressure switch 35 is of a conventional type and may be actuated by either a diaphragm, a spring loaded piston or some other pressure responsive member. For purposes of illustration a piston and ram assembly 36 is connected to a bar 37 adapted to bridge stationary contacts 38 ad 38' in order to close the solenoid circuit. The pressure switch 35 is normally biased to the closed position, as shown in FIG. 1, by a suitable means such as a spring 40. The pressure area of piston and ram assembly 36 is exposed to the pressure in the inlet port 22 through a pilot passage 41 that is formed in the valve body 20 and interconnects inlet port 22 and the pressure port 43 of switch 35. Carried in the pressure port 43 is an orificed dampener means 39 which serves to prevent momentary surges of high pressure in the system from actuating the switch 35. Since the inlet port 22 is in permanent communication with conduit 13, the pressure switch 35 is at all times responsive to the pressure prevailing in the high pressure side of system 5.

A biasing means such as a spring 42 reacts between the main valve body and the spindle 29 to urge the latter into the closed position, as shown in FIG. 1. In the closed position communication is interrupted between inlet port 22 and outlet port 23. It is not intended to limit the invention to the particular details of the spring as shown since the latter may be incorporated into the solenoid and react directly against the armature 32 rather than the spindle 29.

A main relief valve, indicated generally by reference numeral 44, includes a hollow valve plunger 45 slidably carried within a bore 46 provided in the main body 20. Plunger 45 coacts with a valve seat 47 formed in the exhaust passage 27 so that in its seated condition passage 27 will be blocked. Plunger 45 is biased into the closed seated position, as shown in FIG. 1, by means of spring 49 which reacts between plunger 45 and an adjustable sleeve member 50 which is in threaded engagement with a threaded bore in the main valve body 20. Relief valve 44 has been so designed and the biasing spring 49 so selected and adjusted that the predetermined pressure necessary to open switch 35 and which is delivered through outlet port 23 and directed against the pressure exposed area 51 of plunger 45, is sufficient to fully compress the spring 49 and displace the plunger to a full relief position. In other words, the initial opening pressure of relief valve 44 is slightly less than the predetermined pressure necessary to actuate the pressure switch 35 and open the solenoid circuit and the full opening pressure of valve 44 is no more than the predetermined opening pressure of the switch. The significance of this relationship will be explained more fully hereinbelow.

OPERATION

In FIG. 1 the relief valve assembly 19 is shown in the normal nonoperative position wherein the pressure switch 35 is closed energizing the solenoid 31 so as to hold the main pilot valve in the closed position against the force of spring 42; and the relief valve 44 is closed with plunger 45 being seated in valve seat 47. Assume now that the pressure in the high pressure side of the system 5 exceeds a predetermined safe working pressure. This condition may occur, for instance, when an excessive load on the ram 8 creates an abnormally high back pressure in the system when the valve 15 is open or during manipulation of the main control valve to open after the hydraulic jack 6 has reached its full working stroke, as shown in FIG. 2.

Referring now to FIG. 2, the pressure in conduit 13 is communicated to inlet port 22 through conduit 26 and passage 25 and thence against piston and ram assembly 36 of pressure switch 35 through pilot passage 41. This causes bar 37 to break contact with the stationary contacts 38 and 38' deenergizing the solenoid 31 and allowing spring 42 to move the valve spindle 29 to the right. The inlet port 22 is thereby opened to communication with the outlet port 23. Since the predetermined pressure necessary to fully open the relief valve 44 is no more than the predetermined pressure necessary to open the pressure switch 35, plunger 45 will be instantly displaced to the full relief position permitting the high pressure fluid in conduit 13 to be relieved through exhaust passage 27, exhaust conduit 28 and return conduit 17 to the reservoir 12.

It will be readily apparent that when the pressure within conduit 13 of the hydraulic system returns to a safe working pressure the pressure switch 35 will immediately return to the closed position energizing the solenoid. Spindle 29 will be moved by armature 32 to the left against the force of spring 42, and communication between inlet and outlet ports 22 and 23 will be instantaneously interrupted. In the operation of the relief valve assembly 19 from close to open and open to close there is no throttling due to partially opened valves nor is there any valve chatter.

In case of a failure of the electric system the valve spool 29 will be moved to the right by the spring 42 so that pressure fluid can act directly upon the main relief valve which will simply operate in the conventional manner until the electric system can be repaired.

From the foregoing detailed description it will be readily apparent that a new and useful pilot type relief valve assembly has been illustrated which is compact and may be readily combined into existing systems. Further, the provision of a fail safe feature makes this assembly a very practical package.

Although only one embodiment of this invention has been shown and described in detail, it is not intended to limit any patent granted hereon to the specific details of the hydraulic system or to the specific details of the solenoid or pressure switch since others may vary the details of this design to accomplish the same results without deviating from the spirit of this invention.

What is claimed is:

In a fluid pressure system, a pilot type relief valve means comprising: a valve body; an inlet port in said valve body in communication with the high pressure side of said system; an outlet port in said body; a pilot valve for controlling fluid communication between said inlet and outlet ports; a solenoid for operating said pilot valve, the latter interrupting communication between said ports when the solenoid is energized and establishing communication between the ports when the solenoid is deenergized; a pressure sensitive electric switch connected to the solenoid and being responsive to a predetermined maximum fluid pressure in the high pressure side of said system to deenergize the solenoid; dampener means intermediate said high pressure side of said system and said switch for preventing momentary high pressure surges from acting on said switch, exhaust passage means interconnecting said outlet port and the low pressure side of said system; and a pressure responsive valve coacting with said passage means for controlling fluid flow from said outlet port, means biasing said pressure responsive valve to a closed position for blocking said passage, said pressure responsive valve being sensitive to a predetermined maximum pressure in said outlet port to unblock said passage means, the latter maximum pressure being less than said predetermined maximum fluid pressure in said high pressure side of said system.

References Cited in the file of this patent

UNITED STATES PATENTS

| | | |
|---|---|---|
| 2,218,145 | Clayton | Oct. 15, 1940 |
| 2,479,359 | Holt | Aug. 16, 1949 |
| 2,705,608 | Phillips | Apr. 5, 1955 |
| 2,905,432 | Mercier | Sept. 22, 1959 |
| 2,969,088 | Kramer | Jan. 24, 1961 |